Dec. 26, 1967  D. G. BUSCH ETAL  3,359,829
PROPELLER DRIVE
Filed May 24, 1965

INVENTORS
*Donald G. Busch,*
*Calvin C. Covert, &*
*Cyril M. Hawkins*
ATTORNEY

United States Patent Office 3,359,829
Patented Dec. 26, 1967

3,359,829
PROPELLER DRIVE
Donald G. Busch, Calvin C. Covert, and Cyril M. Hawkins, Indianapolis, Ind., assignors to General Motors Corporation, Detroit, Mich., a corporation of Delaware
Filed May 24, 1965, Ser. No. 457,998
4 Claims. (Cl. 74—705)

ABSTRACT OF THE DISCLOSURE

In a preferred form, this invention relates to a split torque gear reduction unit adapted for use in variable pitch propeller drive mechanisms wherein a high speed reversing gear set is utilized with the output therefrom fed to a low speed reversing gear set.

---

This invention pertains to propeller drives, and particularly to an improved split torque dual drive for a variable pitch aircraft propeller.

Heretofore variable pitch aircraft propellers have been driven through a gear reduction unit from a turbine engine through an output shaft which was connected to either the rear of a propeller hub or the front of the propeller hub. In the present invention the propeller hub is journalled on a stationary central hollow shaft and is driven through a two stage split torque gear reduction unit which provides dual drive paths, or outputs, which are connected to both the front and the rear of the propeller hub.

Accordingly, among our objects are the provision of an improved propeller drive including a split torque gear reduction unit of compact size and minimum weight having dual output drive paths connected with the propeller hub; the further provision of a propeller drive arrangement wherein the propeller hub is straddle mounted on a stationary hollow shaft and connected through dual drive paths at the front and rear of the hub with a split torque gear reduction unit; the still further provision of a propeller drive arrangement including a split torque dual reversing gear reduction unit wherein the output of one gear set is connected through a drive shaft to the front of the propeller hub, the output of the second reversing gear set is connected to the rear of the propeller hub and the propeller is rotatably mounted on a stationary tubular portion of the stationary gear carrier of the second reversing gear set.

The aforementioned and other objects are accomplished in the present invention by attaching the gear carrier of the second reversing gear set to the stationary gear reduction housing so as to support the propeller loads on the stationary gear carrier and transfer them into the gear reduction housing. The output of the first reversing gear set is connected to a hollow drive shaft which extends through a stationary hollow shaft extension of the gear carrier of the second reversing gear set and is connected by a drive disc to the front of the propeller hub. The output of the second reversing gear set is connected through a second drive disc to the rear of the propeller hub.

Further objects and advantages of the present invention will be apparent from the following description, reference being had to the accompanying drawing wherein a preferred embodiment of the present invention is clearly shown, and in which the single figure is a fragmentary view with certain parts broken away, partly in section and partly in elevation, of a propeller, spinner and gear reduction unit.

Referring to the drawing, a variable pitch propeller is shown including a hub 10 having a plurality of radially extending sockets 12 within which propeller blades, not shown, are journalled for rotation about their longitudinal axes to vary the pitch position thereof. The pitch changing means for the propeller constitutes no part of the present invention, but may be of the type disclosed in U.S. Patents 3,003,566 and 3,026,740. Moreover, in accordance with conventional practice, the propeller hub and gear reduction unit are enclosed by a streamlined spinner 13. The propeller hub 10 is rotatably journalled and straddle mounted on a stationary hollow shaft extension 14 which is integral with a stationary gear carrier 16 of a low speed reversing gear set 18. The gear carrier 16 is connected by a plurality of bolts 20 to an annular member 22 which is in turn connected by a plurality of bolts 24 to a stationary gear reduction housing 26. The low speed gear set 18 is enclosed by a two part housing 27 which is secured to the housing 26 by a plurality of bolts 29.

Propeller hub 10 is journalled on the stationary shaft extension 14 by a thrust ball bearing assembly 28 and a radial roller bearing assembly 30 at the front propeller hub as well as a radial roller bearing assembly 32 at the rear of the propeller hub. A high speed turbine driven shaft 34 has a straight spline connection at 36 with a gear 38 of a high speed reversing gear set 40. The gear 38 meshes with four gears 42 journalled by spaced roller bearing assemblies 44 and 46 in a gear carrier 48 of the high speed reversing gear set 40. The gear carrier 48 is journalled by roller bearing assembly 50 in the stationary gear reduction housing 26. The gears 42 mesh with a ring gear 52 of the high speed reversing gear set 40.

The gear carrier 48 comprises a rear disc 54 and a front disc 56 which are maintained in spaced relation and rigidly interconnected by a plurality of bolts 58 which extend through spacers 60. The front disc 56 of the gear carrier 48 includes an integral tubular extension 62 having a straight spline connection at 64 of a hollow drive shaft 68 coaxially disposed within the hollow shaft extension 14 and extending therethrough. The front of the drive shaft 68 has a straight spline connection at 70 with a drive disc 72 which is supported by ball bearing assembly 71. The disc 72 has a straight spline connection at 74 with the front of the propeller hub 10. The drive disc 72 is secured against axial movement relative to the propeller hub 10 by an externally threaded nut 76.

The ring gear 52 of the high speed reversing gear set 40 has a straight spline connection at 78 with a drive disc 80 which in turn has a straight spline connection at 82 with a gear 84 of the low speed reversing gear set 18. The gear 84 meshes with four gears 86 journalled by roller bearing assemblies 88 and 90 in the stationary gear carrier 16. The gears 86 in turn mesh with a ring gear 92 of the low speed gear set 18 which has a straight spline connection at 94 with a drive disc 96 having a straight spline connection 98 with the rear of the propeller hub 10.

As seen in the drawing, a ball bearing assembly 100 is provided between the tubular portion 62 of the gear carrier 48 and the drive disc 80, and a second ball bearing assembly 102 is provided between the drive disc 80 and the stationary gear reduction housing 26. In operation, rotation of the turbine driven shaft 34 drives the gear 38 of the high speed reversing gear set 40, which rotation is imparted to the gears 42 which in turn imparts rotation to the gear carrier 48. The first of the dual drive paths to the propeller from the split torque gear reduction unit is taken from the gear carrier 48 and delivered to the propeller hub 10 through the hollow drive shaft and the drive disc 72. The input torque is split, however, as another portion thereof is put through the low speed gear set through the ring gear 52 of the reversing gear set 40. Thus, rotation of the ring gear 52 is imparted through the drive disc 80 to the gear 84 of the low speed gear set 18 which has a stationary gear carrier 16. Moreover, rotation of the gear 84 is imparted to the ring gear 92 through the gears 86, and the ring gear 92 supplies this torque to the rear of the propeller hub through drive disc 96. Accordingly, it is apparent that the torque is split since only a portion of the torque goes directly through the high speed reversing gear set 40 to the front of propeller hub 10 and the remainder goes through the low speed gear set 18 and is supplied to the propeller hub 10 through the rear drive connection. It is in this manner that the gear reduction can be reduced in size and weight. Moreover, by providing dual output drive paths from the gear reduction unit the propeller can be straddle mounted on the stationary gear carrier and driven from both ends.

The split torque dual reversing gear reduction unit can be designed to obtain different reduction ratios and is suitable for use with a turbine engine of the 4000 to 5000 horsepower class. Preferably, the propeller is driven at a speed of approximately 1000 r.p.m. such that with an input shaft speed of 14,500 r.p.m., the reduction ratio will be 14.5 to 1, and with an input shaft speed of 17,100 r.p.m., the reduction ratio will be 17.1 to 1.

In a typical gear reduction unit constructed according to the invention having a reduction ratio of 14.5 to 1, and assuming the rotative speed of the input shaft 34 to be unity, the following are the approximate rotative speeds of the other components:

| | |
|---|---|
| Gear 38 | 1.00 |
| Gears 42 | −0.61 |
| Ring gear 52 | −0.18 |
| Carrier 48 | 0.069 |
| Gear 84 | −0.18 |
| Gears 86 | 0.23 |
| Ring gear 92 | 0.069 |

The minus sign (−) indicates direction of rotation reversed relative to input shaft 34.

In addition, the several gears in both the high and low speed reversing gear sets have helical gear teeth. Thus, gear 38 may have teeth with a 25° right-hand helix angle while gears 42 and the ring gear 52 have teeth with a 25° left-hand helix angle. Gear 84 of the low speed reversing gear set may have teeth with an 11.5° left-hand helix angle while the gears 86 and the ring gear 92 have teeth with 11.5° right-hand helix angle. The helix angle of the teeth on the low speed ring gear 92 is selected so as to generate an axial thrust substantially equal to and in a direction opposite to the propeller thrust loads so as to offset, or balance, the same. In this manner the bearing and gear loads are minimized, as are the stresses imposed upon the rotating shafts.

While the embodiment of the present invention as herein disclosed, constitutes a preferred form, it is to be understood that other forms might be adopted.

What is claimed is as follows:

1. An aircraft propeller drive system including, a high speed input shaft, a split torque gear reduction unit comprising a high speed reversing gear set and a low speed reversing gear set, each gear set including a gear, a ring gear and a plurality of gears connecting said gear and said ring gear including a carrier for said gears, a driving connection between said high speed gear and said input shaft, a stationary support for said low speed gear carrier, said low speed gear carrier having an integral stationary hollow shaft extension, a propeller hub journalled by spaced bearings on said stationary shaft extension, a driving connection between said high speed ring gear and said low speed gear, and dual drive paths from said split torque gear reduction unit to opposite ends of said hub comprising a positive driving connection from said high speed gear carrier including means extending through said hollow shaft extension to the front of said hub and a positive driving connection between said low speed ring gear and the rear of said propeller hub.

2. An aircraft propeller drive system including, a high speed input shaft, a split torque gear reduction unit comprising a high speed reversing gear set and a low speed reversing gear set, each gear set including a gear, a ring gear and a plurality of gears connecting said gear and said ring gear including a carrier for said gears, a driving connection between said high speed gear and said input shaft, a stationary support for said low speed gear carrier, said low speed gear carrier having an integral stationary hollow shaft extension, a propeller hub journalled by spaced bearings on said stationary shaft extension, a driving connection between said high speed ring gear and said low speed sun gear, and dual drive paths from said split torque gear reduction unit to opposite ends of said hub comprising a first positive driving connection between the front of said hub and said high speed gear carrier including a shaft coaxial with said stationary hollow shaft extension and extending therethrough and a second positive driving connection between said low speed ring gear and the rear of said propeller hub.

3. An aircraft propeller drive system including, a high speed input shaft, a split torque gear reduction unit comprising a high speed reversing gear set and a low speed reversing gear set, each gear set including a gear, a ring gear and a plurality of gears connecting said gear and said ring gear including a carrier for said gears, a driving connection between said high speed gear and said input shaft, a stationary housing enclosing said gear reduction unit, means rigidly interconnecting said low speed gear carrier and said gear reduction unit housing, said low speed gear carrier having an integral stationary hollow shaft extension projecting forwardly therefrom, a propeller hub straddle mounted by spaced bearings on said forwardly projecting stationary shaft extension, a first drive disc having straight spline connections with said high speed ring gear and said low speed gear for establishing a driving connection therebetween, and dual drive paths from said split torque gear reduction unit to opposite ends of said propeller hub comprising a first positive driving connection between said high speed gear carrier and the front of said propeller hub and a second positive driving connection between said low speed ring gear and the rear of said propeller hub, said first positive driving connection between said high speed gear carrier and the front of said hub comprises a shaft having a straight spline connection with said high speed gear carrier at one end, said shaft extending forwardly through the stationary hollow shaft extension of said low speed gear carrier, and a drive disc having straight spline connections with the other end of said shaft and the front of said propeller hub.

4. The propeller drive system set forth in claim 3 wherein said second positive driving connection between said low speed ring gear and the rear of said propeller hub comprises a drive disc disposed within said gear reduction housing, said drive disc having straight spline connections with said low speed ring gear and the rear of said propeller hub.

References Cited

UNITED STATES PATENTS

| 1,513,738 | 11/1924 | Bomborn | 74—705 |
| 1,986,310 | 1/1935 | Werner | 170—135.75 |
| 2,348,716 | 5/1944 | Banker | 170—135.75 |
| 2,488,660 | 11/1949 | Conkle | 74—705 |
| 2,855,055 | 10/1958 | Barish et al. | 170—135.75 |

FOREIGN PATENTS 847,311    10/1939    France.

DONLEY J. STOCKING, *Primary Examiner.*

THOMAS C. PERRY, *Examiner.*